(12) United States Patent
Han

(10) Patent No.: US 10,275,850 B2
(45) Date of Patent: Apr. 30, 2019

(54) EXTENDED CONTROL DEVICE OF GRAPHICS CARD

(71) Applicant: EVGA CORPORATION, New Taipei (TW)

(72) Inventor: Tai-Sheng Han, New Taipei (TW)

(73) Assignee: EVGA CORPORATION, New Taipei (TW)

( * ) Notice: Subject to any disclaimer, the term of this patent is extended or adjusted under 35 U.S.C. 154(b) by 0 days.

(21) Appl. No.: 15/456,574

(22) Filed: Mar. 12, 2017

(65) Prior Publication Data

US 2018/0204302 A1     Jul. 19, 2018

(30) Foreign Application Priority Data

Jan. 16, 2017 (TW) .............................. 106200779 U

(51) Int. Cl.
| | | |
|---|---|---|
| *G06T 1/20* | (2006.01) | |
| *G06F 1/20* | (2006.01) | |
| *G06F 13/40* | (2006.01) | |

(52) U.S. Cl.
CPC ................... *G06T 1/20* (2013.01); *G06F 1/20* (2013.01); *G06F 13/4068* (2013.01)

(58) Field of Classification Search
CPC .............................. G06T 1/20; G06F 13/4068
USPC ......................................................... 345/501
See application file for complete search history.

(56) References Cited

U.S. PATENT DOCUMENTS

| | | | | |
|---|---|---|---|---|
| 7,882,369 | B1* | 2/2011 | Kelleher | G06F 1/3203 345/419 |
| 2005/0030171 | A1* | 2/2005 | Liu | G06F 1/206 340/500 |
| 2005/0285863 | A1* | 12/2005 | Diamond | G06F 3/1438 345/519 |
| 2011/0279969 | A1* | 11/2011 | Memon | G06F 1/20 361/679.47 |
| 2013/0257593 | A1* | 10/2013 | Yang | G06F 1/203 340/6.1 |
| 2014/0036443 | A1* | 2/2014 | Xu | H05K 7/20209 361/695 |
| 2015/0192913 | A1* | 7/2015 | Vitek | G05B 9/02 700/275 |

\* cited by examiner

*Primary Examiner* — Jacinta M Crawford
(74) *Attorney, Agent, or Firm* — Leong C. Lei

(57) ABSTRACT

An extended control device of a graphics card includes a graphics card body, a reader module, and a control module. The reader module and the control module are provided on the graphics card body. The control module is operable in combination with the reader module. As such, when the reader module reads a situation that the graphics card body has an abnormal status or a user attempts to make adjustment by himself or herself, the user is allowed to directly control and adjust an operation mode of an electronic element directly through the control module provided on the graphics card body so that there is no need to install a control module in each electronic element for individual and independent control and the user can use the control module of the graphics card body to completely control the operation status of each electronic element in the entire area.

1 Claim, 5 Drawing Sheets

EXTENDED CONTROL DEVICE OF GRAPHICS CARD

TECHNICAL FIELD OF THE INVENTION

The present invention relates generally to a control device, and more particularly to an extended control device of a graphics card that allows for direct control operation performance of other peripheral devices by directly using a control module contained in the graphics card.

DESCRIPTION OF THE PRIOR ART

The vivid development of the electronic technology makes electronic devices, such as computers and mobile phones a necessary part of daily living of human beings and also brings fast growth of peripheral products thereof, such as graphic programs and on-line games. To allow the software to run smoothly, it is often to install a powerful display operation module, such as an externally mounted graphics card, in a computer.

Compared to a display module built in a main board, the externally mounted addin card provides more powerful computation capability, yet the operation of the external graphics card consumes a relatively high amount of electrical power during the operation. When the power consumed in the operation is increased, it often indicates the temperature and frequency of the graphics card are increased in association therewith. This makes it necessary for a fan to be operated more powerfully in order to lower down the temperature. In addition, the related peripheral devices, such as a main body and a central processing unit (CPU), or a memory, may need to heighten power consumption thereof. As such, in order to control the operation performance of the graphics card, the main body, the CPU, or the memory, it requires a control module to be installed in each of these devices/components in order to individually control each of these devices/components. Generally, speaking, this means each of the devices/component must have its own control module and installation must be done separately for each individual device/component. This is troublesome.

Thus, it is a challenge of those devoted in this field to provide a solution to overcome such problems.

SUMMARY OF THE INVENTION

In view of the above problems and drawbacks, the present invention aims to provide an extended control device of a graphics card that allows for direct control operation performance of other peripheral devices by directly using a control module contained in the graphics card.

The primary objective of the present invention is to provide a reader module and a control module on a graphics card body so as to make it unnecessary for each of electronic elements to install an independent control module of its own, whereby the control module provided on the graphics card body can be used to completely control a status of each of the electronic elements, making the measure easy and convenient.

Another objective of the present invention is that in addition to just read the status of the graphics card body, the reader module may additionally read an operation status of the electronic element so as to expand a detection range thereof to achieve an advantage of monitoring and control featuring diversification and universality.

A structure that the present invention adopts to achieve the above objectives comprises a graphics card body, wherein the graphics card body is provided thereon with at least one reader module that reads a status of the graphics card body and a control module operable in combination with the reader module. In other words, the reader module reads a status of the graphics card body, such as an operation status, a status of frequency, and a status of temperature. When the reader module detects a situation that abnormality occurs in the above status of the graphics card body or a user attempts to make adjustment by himself or herself, the control module can be used to conduct a one-to-one or one-to-multiple control and adjustment on the electronic element. This implies that there is no need for the electronic element to individually install a control module, and the control module provided on the graphics card body can be used to control each electronic element.

With the above technique, the drawbacks and problems of the prior art that each device/component must be installed with an individual control module of their own in order to individually control each device/component, this being such that each device/component includes a control module of its own, and the installation must be done individually on each device/component, making it very troublesome, can be overcome and an advantage of improving utilization according to the present invention can be achieved.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
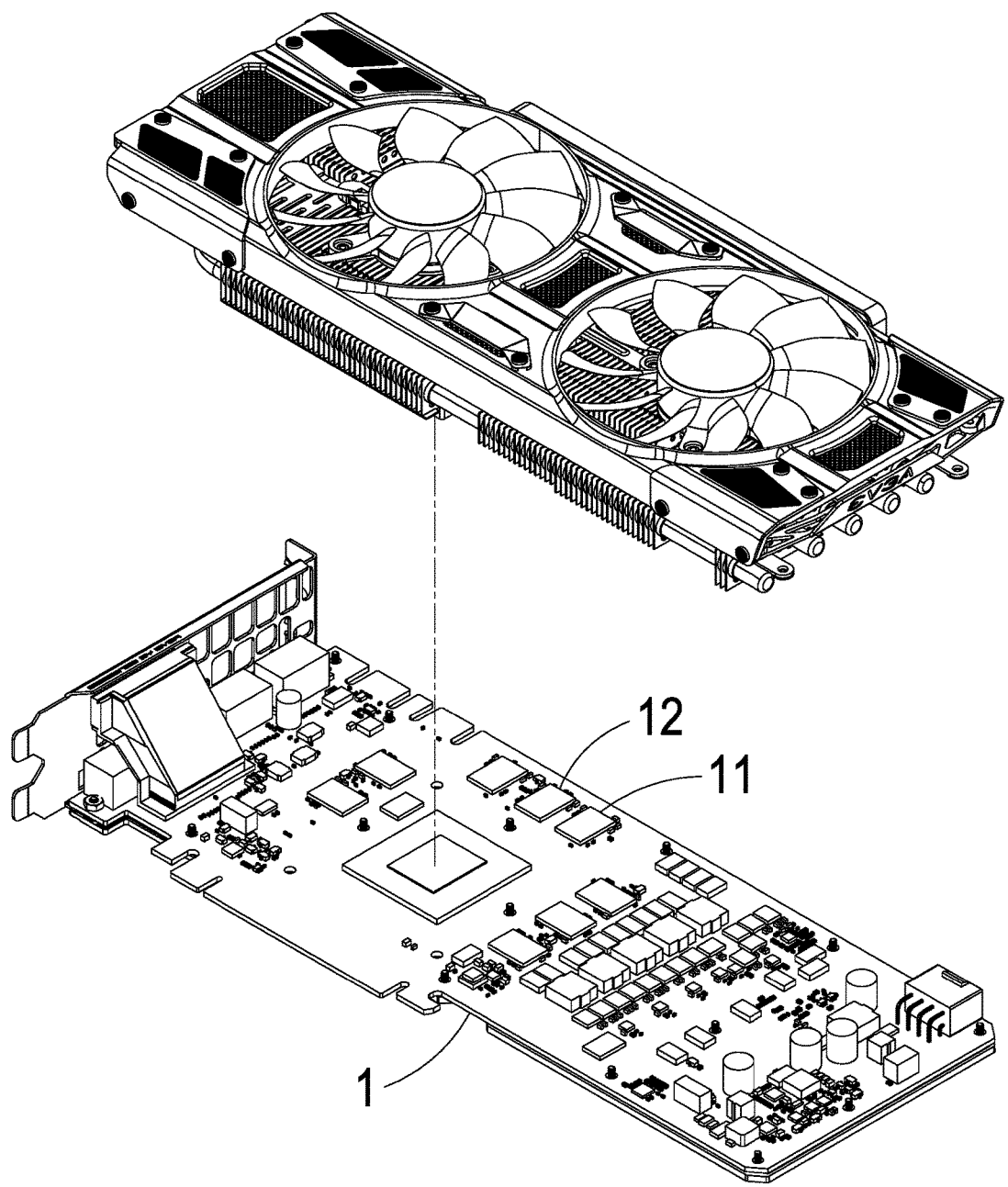
FIG. 1 is an exploded view showing a graphics card according to a preferred embodiment of the present invention.
Figure 2:
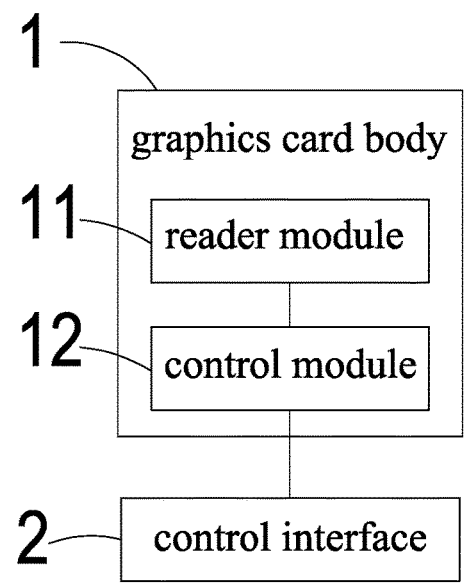
FIG. 2 is a structure block diagram of the preferred embodiment of the present invention.
Figure 3:
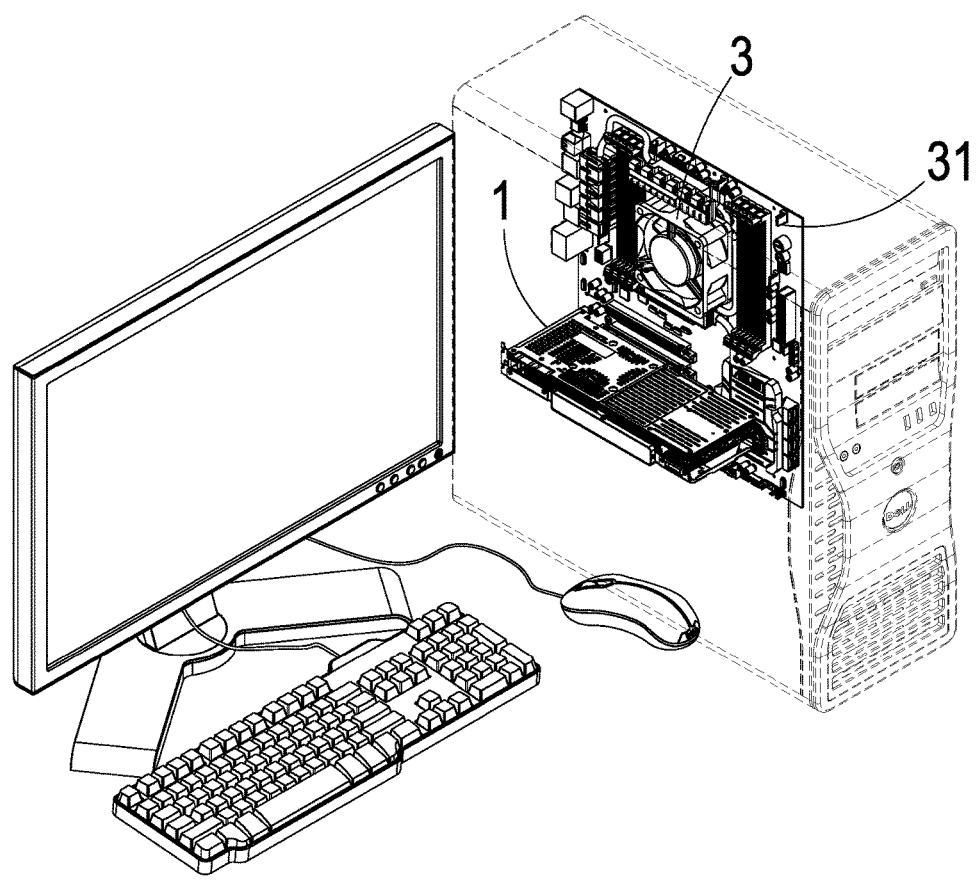
FIG. 3 is a schematic view showing an application of the preferred embodiment of the present invention.
Figure 4:
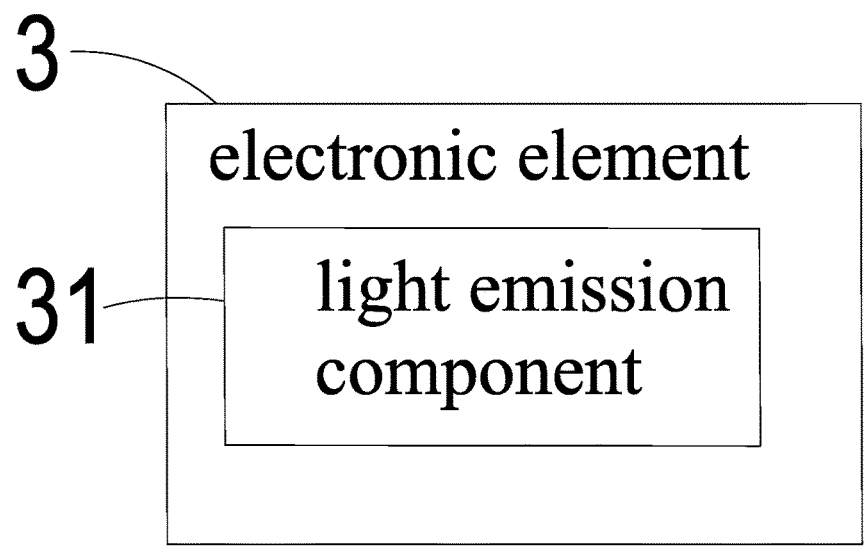
FIG. 4 is a structure block diagram of an electronic element of the preferred embodiment of the present invention.
Figure 5:
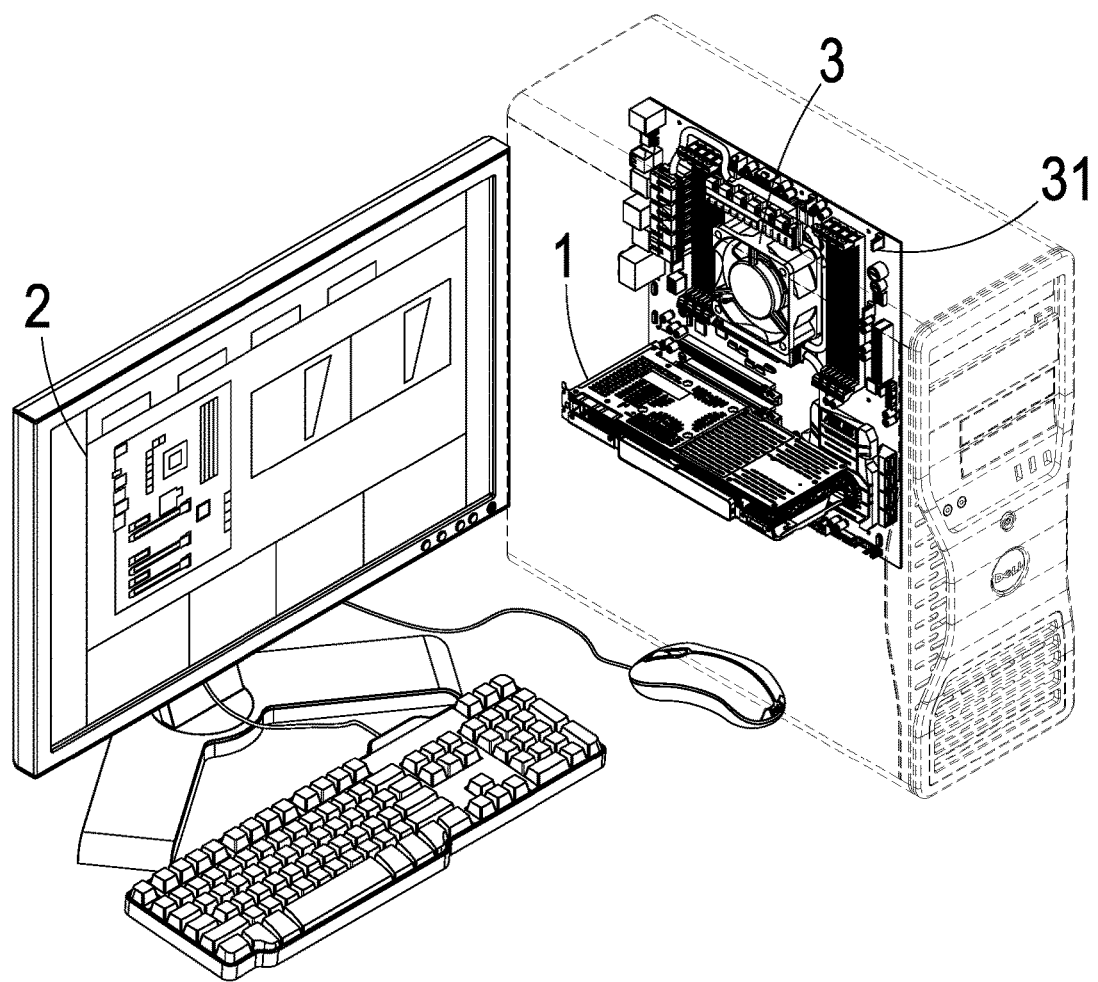
FIG. 5 is a schematic view illustrating an example of control of the preferred embodiment of the present invention.

Referring to FIGS. 1 and 2, which are respectively an exploded view showing a graphics card according to a preferred embodiment of the present invention and a structure block diagram of the preferred embodiment of the present invention, it can be clearly seen from the drawings that the present invention comprises:

a graphics card body 1;

at least one reader module 11 arranged on the graphics card body 1, wherein the reader module 11 can be one of a temperature detection module, a frequency detection module, and a fan rotational speed detection module; and a control module 12 arranged on the graphics card body 1 to be operated in combination with the reader module 11, wherein the control module 12 is in information connection with a control interface 2, such that the control module 12 may acquire a status of the graphics card body 1 by means of the reader module 11 and controls the control module 12 by means of the control interface 2 to conduct a control operation on at least one electronic element.

Referring collectively to FIGS. 1-5, which are respectively an exploded view showing a graphics card according to a preferred embodiment of the present invention, a structure block diagram of the preferred embodiment of the present invention, a schematic view showing an application of the preferred embodiment of the present invention, a structure block diagram of an electronic element of the preferred embodiment of the present invention, and a schematic view illustrating an example of control of the preferred embodiment of the present invention, it can be clearly seen from these drawings that the graphics card body 1 of the present invention can be set in electrical connection with one or multiple electronic elements 3, wherein the electronic element 3 can be one of a fan, a chip, an addin card, and a power supply device and is provided thereon with at least one light emission component 31 in information connection with the control module 12. As such, the instant embodiment is such that an electronic element 3 is embodied as comprising a light emission component 31; the reader module 11 is embodied as comprising a temperature detection module; and the electronic element 3 is embodied as comprising a fan. When the reader module 11 detects a temperature of the graphics card body 1 itself or a temperature of a surrounding environment thereof gets excessively high, the control module 12 is allowed to directly control at least one the electronic element 3 arranged nearby and in information connection with the graphics card body 1 to increase an operation speed thereof in order to work collectively to lower down a temperature surrounding the graphics card body 1. Further, it is also possible that when the reader module 11 detects abnormality of a status of the graphics card body 1 or when a user attempts to make adjustment by himself or herself, the control module 12 may be operated to light up the light emission component 31 of the electronic element 3 so as to allow the user to clearly observe lighting and thus warning issued from the light emission component 31 of the electronic element 3 to indicate for example an excessively high temperature and the control interface 2 can be operated to manipulate and control the control module 12 to take a responsive operation on the graphics card body 1, or to operate the control module 12 to increase the operation speed of the electronic element 3.

Further, the control interface 2 can be a software based interface, which can be displayed on a screen of a computer to be observed by a user. The control module 12 may similarly be control software or alternatively a physical component (and a physical component is taken as an example in this embodiment).

Further, the present invention may be embodied as automatically controlled adjustment. For example, when the reader module 11 detects a situation that abnormality occurs in the graphics card body 1 or a user attempts to make adjustment by himself or herself, the control module 12 may actively conduct a control operation for adjustment of the electronic element 3 such that the electronic element 3 can be completely controlled by the graphics card body 1 without the need to install a control module 12 of its own.

Further, in addition to the embodiment described above, alternative embodiments are also available. For example, in addition to just reading a status of the graphics card body 1 itself, the reader module 11 may additionally read an operation status of the electronic element 3, such as temperature and frequency. A measure to achieve that can be that electrical connection between the graphics card body 1 and the electronic element 3 (which is taken as a main board) is used to read the status of another electronic element 3 (such as a central processing unit and a memory) that is in electrical connection with the electronic element 3 (the main board) so that when abnormality is identified afterwards, the user may conduct a control operation over the electronic element 3 (such as the central processing unit and the memory) through the control module 12. Thus, an advantage of monitoring and control featuring diversification and universality can be achieved.

The example provided previously is concerned about just a preferred way of embodying the present invention and is not intended to impose limitations to the scope of the present invention. Minor modifications and variations that do not depart from the inventive idea of the present invention as defined in the attached claims, are considered within the scope of the present invention.

Thus, with reference to all the drawings, when put into use, the present invention provides, compared to the prior art, the following advantages:

(1) The arrangement of the reader module 11 and the control module 12 on the graphics card body 1 makes it not necessary for each electronic element 3 install an independent control module of its own and it only needs to use the control module 12 provided on the graphics card body 1 to achieve complete control of the status of each electronic element 3, making the measure easy and convenient.

(2) In addition to just read the status of the graphics card body 1, the reader module 11 is allowed to additionally read the operation status of the electronic element 3 so as to expand a detection range thereof to achieve an advantage of monitoring and control featuring diversification and universality.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. An extended control device of a graphics card, comprising:

a graphics card body;
at least one reader module arranged on the graphics card body; and a control module arranged on the graphics card body and operable in combination with the reader module such that the control module is allowed to read data of an operation status of the graphics card body by means of the reader module to selectively control an operation status of at least one electronic element that is a separate element arranged externally of the graphics card body and in information connection with the graphics card body;
wherein the electronic element comprises one of a fan, a chip, an add-in card, and a power supply device;
wherein the electronic element is provided thereon with at least one light emission component mounted thereto and in information connection with the control module;
wherein the control module is in information connection with a control interface to display the operation status of the electronic element and to allow a user to operate, through the control interface, the control module to conduct control on the operation status of the electronic element and the operation status of the graphics card body; wherein the reader module comprises one of a temperature detection module, a frequency detection module, and a fan rotational speed detection module; and
wherein the reader module is operable to read the operation status of the electronic element.

* * * * *